Patented June 14, 1932

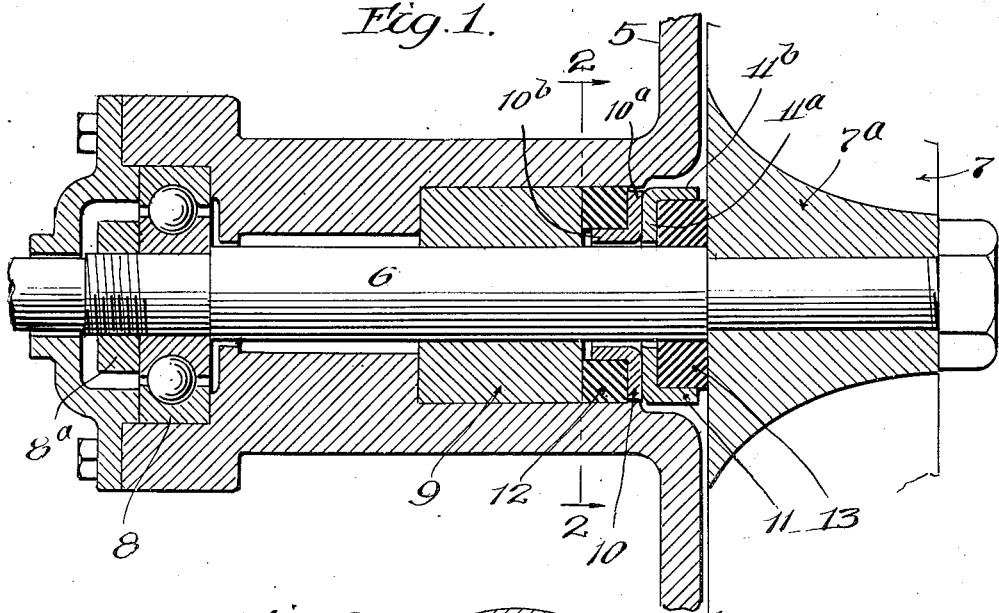
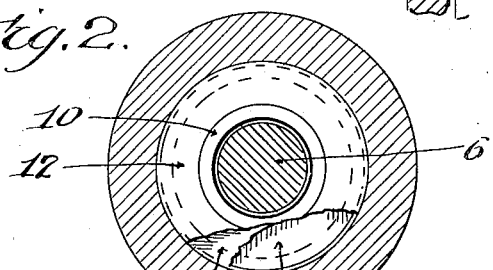
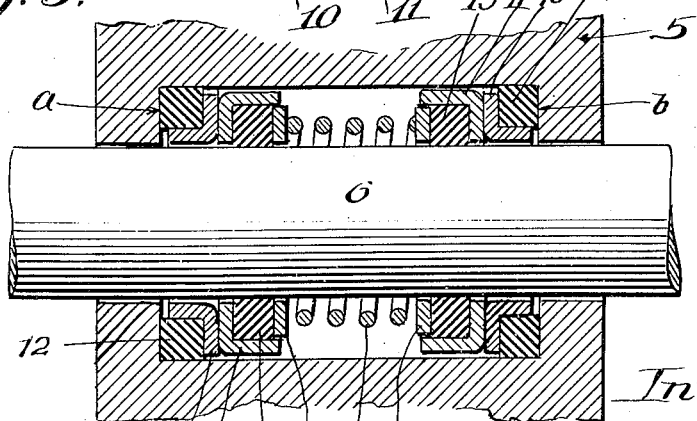

1,862,887

UNITED STATES PATENT OFFICE

AUGUSTUS C. DURDIN, JR., OF CHICAGO, ILLINOIS, ASSIGNOR TO CHICAGO PUMP COMPANY, OF CHICAGO, ILLINOIS, A CORPORATION OF ILLINOIS

SEAL FOR SHAFTS

Application filed April 20, 1929. Serial No. 356,629.

This invention relates to seals for shafts, and has reference more particularly to that type of seals for shafts which employ a rotating metal seal ring on the shaft, which ring has a running contact with the surface of a stationary element such as the case wall through which the shaft extends.

Considerable difficulty has been encountered with seals of this type because of the presence of blow holes in the metal that contacts with the ring, and leakage is likely to occur through the blow holes. The principal object of the present invention is to provide an efficient seal, despite the presence of imperfections of this character in the casing. Another object is to simplify and otherwise improve on seals of the type mentioned, whereby a highly efficient seal is obtained.

The invention consists in the several novel features hereinafter fully set forth and claimed.

The invention is clearly illustrated in the drawing accompanying this specification in which—

Figure 1 is a central vertical section of a seal for shafts embodying a simple form of the present invention showing its application to the shaft of a pump;

Fig. 2 is a detail vertical cross section taken on the line 2—2 of Fig. 1; and

Fig. 3 is a central vertical section through a modified form of the invention.

Referring to said drawing, and first to Figs. 1 and 2, the reference character 5 designates a fragment of the case wall of a pump, compressor or other apparatus in which is journaled a shaft 6 that protrudes from the case wall and has an impeller, agitator or other rotating member 7 secured on its outer end. The hub 7ª of the member 7 provides a shoulder on the shaft and co-operates with the sealing members, as will be presently explained.

In the present instance, the shaft 6 is shown as journaled in bearings 8 and 9 carried by the case wall, the bearing 8 being here shown in the form of a ball bearing having adjustment means, such as a nut 8ª, whereby the shaft may be adjusted in a direction lengthwise of itself for the purpose of maintaining a close contact between the seal members, as will presently appear. The bearing 9 is shown in the form of a bushing and may be regarded as part thereof or as a stationary member of the case through which the shaft extends from the interior of the case to the exterior thereof.

In certain situations there is a possibility of leakage from the exterior of the case to the interior through the clearance space between the case wall or the bearing bushing and the shaft, particularly in the case of liquid pumps or other apparatus working in liquid. When applied to a compressor, leakage from the interior of the case out through the clearance space between the case wall and the shaft occurs, and the present seal has been provided to prevent leakage into or from the case.

Interposed between a stationary element of the case through which the shaft extends and a rotating element of the shaft, such as the hub 7ª of the impeller 7, or other shoulder, are the sealing members, which in the preferred form of the invention, comprise two contacting relatively rotating metal seal rings 10 and 11, and two resilient rings 12 and 13, usually composed of rubber and held under compression one between the side of the metal seal ring 10 and the stationary element, and the other between the ring 11 and the rotating element.

The metal seal rings may be formed with straight side portions 10ª and 11ª, the adjacent faces of which contact with each other, and from the straight sides extend annular flanges 10ᵇ and 11ᵇ which project oppositely from the rings. The flange 10ᵇ is located adjacent the shaft and together with the straight edge 10ª forms an angle in which is received two sides of the associated rubber ring 12, the other two sides of the rubber ring being received in an angle formed in the stationary member, as the case wall, or by the case wall and bearing bushing. The flange 11ᵇ extends from the outer periphery of the metal seal ring 11 and overhangs the rubber ring 13, two sides of which are received in the angle formed by the side 11ª and flange 11ᵇ, and the other two sides of which are received in the angle formed between the shaft and hub of the impeller or other element.

With the sealing members in place, the shaft 6 is adjusted lengthwise of itself, as, for instance, by drawing up on the nut 8ª for the ball bearing, thereby compressing the rubber rings 12 and 13, one between one metal ring 10 and the stationary member of the case, and the other between the other metal ring 11 and the rotating element. A tight closure is thereby obtained between the case wall and one metal ring, between the contigous faces of the metal rings and between the other metal ring and the shaft, thereby effectively sealing the interior of the case from the exterior thereof around the shaft.

The rubber rings being held under compression, sufficient friction is created between them and the parts with which they contact to prevent relative rotation between them and said parts, the result being that the rubber ring 12 and the metal ring 10 remain stationary and the rubber ring 13 and metal ring 11 rotate with the shaft, thereby causing relative rotation between the two metal rings. The contacting faces of the metal rings are preferably ground flat so as to provide a close running contact between them, and the continued rubbing action between the two metal rings has the effect of polishing them and thereby obtaining a very close contact. To prevent undue wear of the rings, one may be made of hardened steel and the other of cast iron, or suitable alloyed metals may be employed which will retard wear, as is well understood.

In the modified form of the invention illustrated in Fig. 3, two sets $a$ and $b$ of metal and rubber sealing rings, similar to the rings of the preferred form, are employed between the shaft and case wall, and a coiled compression spring 14 is employed between the two sets for obtaining compression of the rubber rings against the associated parts and for holding the metal rings of each set in close running contact. Preferably washers 15 are interposed between the ends of the coiled spring and the adjacent rubber rings. This arrangement provides a double seal around the shaft and is particularly applicable in cases where pressure may escape from or into the interior of the case around the shaft. Each washer 15 serves as a shoulder on the shaft which bears against the adjacent resilient sealing ring. In this case, however, it is movable along the shaft and held in pressing engagement with the resilient ring by spring pressure or otherwise.

By forming the contacting relatively rotating faces on relatively small metal rings there is very little, if any, likelihood of blow holes, or other imperfections occurring in the contacting faces thereof. Any blow holes that may be present in the castings, such as the case wall or impeller hub or other shoulder on the shaft, is sealed by the rubber rings which readily accommodate themselves to any unevenness of the surfaces of the castings. An effective seal is thus provided which requires no adjusting or replacement of packing, as is customary with stuffing boxes.

More or less variation of the exact details of construction is possible without departing from the spirit of this invention. I desire, therefore, not to limit myself to the exact form of the construction shown and described, but intend, in the following claims, to point out all of the invention disclosed herein.

I claim as new, and desire to secure by Letters Patent:

1. A seal for rotating shafts comprising two relatively rotatable metal rings held in running contact with each other, two resilient sealing rings disposed at the sides of the metal rings and contacting therewith, all of said rings being adapted to surround a rotatable shaft, and one resilient sealing ring contacting with a stationary wall and the other with the shaft, and means for applying pressure upon said rings in a direction parallel with the shaft whereby the resilient sealing rings are compressed and the metal rings held in close running contact.

2. A seal for rotating shafts comprising two relatively rotatable metal rings held in running contact with each other, two resilient sealing rings disposed at the sides of the metal rings and contacting therewith, all of said rings being adapted to surround a rotatable shaft provided with a shoulder, one of said resilient sealing rings contacting with a stationary member and the other with the shoulder of the shaft, and means for applying pressure upon said rings in a direction parallel with the shaft whereby the resilient sealing rings are compressed and the metal rings held in close running contact.

3. A seal for rotating shafts comprising two rotatable metallic rings, one of which is composed of hardened steel and one of cast iron, said rings being held in running contact with each other, two rubber rings one disposed at each side of the metal rings and contacting therewith, all of said rings being adapted to surround a rotatable shaft and one rubber ring contacting with a stationary member and the other with the shaft, and means for applying pressure upon said rings in a direction parallel with the shaft whereby the rubber rings are compressed and the metal rings held in close running contact.

4. In a seal for shafts, the combination with a rotating shaft and a stationary member through which the shaft extends, of stationary and rotatable metal seal rings surrounding the shaft and held in running contact with each other, stationary and rotatable resilient sealing members surrounding the shaft, one on each side of the metal seal rings, the stationary resilient sealing member being held under compression against one seal ring and the stationary member and the other being held under compression against the other seal ring and shaft.

5. In a seal for shafts, the combination with a rotatable shaft and a stationary member through which the shaft extends, of two metal seal members surrounding the shaft and held in running contact with each other, and resilient sealing members surrounding the shaft, one on each side of the metal seal members and one rotatable with the shaft and held under compression between one seal member and the shaft and the other being stationary and held under compression against the stationary member and the other metal seal member.

6. In a seal for shafts, the combination with a rotary shaft and a stationary member through which the shaft extends, of stationary and rotatable flanged metal seal rings surrounding the shaft, stationary and rotatable resilient sealing rings surrounding the shaft, one on each side of the metal rings, the stationary resilient sealing member surrounding the flange of the stationary metal seal ring and being held under compression between said ring and the stationary member and the other resilient sealing member being surrounded by the flange of the other metal seal ring and held under compression between said ring and the shaft, and means for applying pressure in a direction parallel with the shaft upon said rings whereby the resilient rings are compressed and the metal rings held in running contact.

7. In a seal for shafts, the combination with a rotary shaft having a shoulder thereon and a stationary member through which the shaft extends, of stationary and rotatable flanged metal seal rings surrounding the shaft, stationary and rotatable resilient sealing rings surrounding the shaft, one on each side of the metal rings, the stationary resilient sealing member surrounding the flange of the stationary metal seal ring and being held under compression between said ring and the stationary member and the other resilient sealing member being surrounded by the flange of the other metal seal ring and held under compression between said ring and the shoulder on the shaft, and means abutting said shoulder on the shaft for applying pressure in a direction parallel with the shaft upon said rings whereby the resilient rings are compressed and the metal rings held in running contact.

8. In a seal for shafts, the combination of a rotary shaft and a stationary member having an outwardly opening recess through which said shaft extends, of a pair of contacting metal seal rings surrounding the shaft, resilient seal rings disposed on the sides of the pair of metal seal rings, one of the resilient seal rings contacting with the stationary member and the other resilient seal ring frictionally engaging and rotating with the shaft, and means exteriorly of the stationary member for applying pressure on the rings in a direction lengthwise of the shaft.

9. In a seal for shafts, the combination with a rotary shaft and a stationary member through which the shaft extends, said stationary member being provided with stationary abutment faces, of two sets of sealing members, each comprising contacting metal seal rings and resilient sealing rings contacting with the outer sides thereof, one resilient sealing ring of each set abutting against a stationary abutment face and one frictionally engaging and rotating with the shaft, and means for applying pressure in a direction lengthwise of the shaft upon both sets of sealing members.

10. In a seal for shafts, the combination with a rotary shaft and a stationary member through which the shaft extends, said member being provided with stationary abutment faces, of two sets of sealing members, each comprising contacting metal seal rings and resilient sealing rings contacting with the other sides thereof, one resilient sealing ring of each set abutting against a seal ring and a stationary abutment face, and one frictionally engaging and rotating with the shaft and being confined under compression between the other ring and the shaft, and means for applying pressure in a direction lengthwise of the shaft upon both sets of sealing members.

11. In a seal for shafts, the combination with a rotary shaft and a stationary member through which the shaft extends, said member being provided with stationary abutment faces, of two sets of sealing members, each comprising contacting metal seal rings and resilient sealing rings contacting with the outer sides thereof, one resilient sealing ring of each set abutting against a stationary abutment face, and one frictionally engaging and rotating with the shaft, washers, one engaging with the last mentioned resilient sealing ring of each set, and a coiled compression spring interposed between said washers.

AUGUSTUS C. DURDIN, Jr.